(12) United States Patent
Gong et al.

(10) Patent No.: US 10,943,327 B2
(45) Date of Patent: Mar. 9, 2021

(54) METHOD AND DEVICE FOR STORING IMAGE DATA

(71) Applicants: CAPITAL NORMAL UNIVERSITY, Beijing (CN); CHINAMAP HI-TECH (BEIJING) INFORMATION TECHNOLOGY CO., LTD., Beijing (CN)

(72) Inventors: Huili Gong, Beijing (CN); Xiaojuan Li, Beijing (CN); Guanjia Meng, Beijing (CN); Ruofei Zhong, Beijing (CN); Jiao Guo, Beijing (CN); Cankun Yang, Beijing (CN)

(*) Notice: Subject to any disclaimer, the term of this patent is extended or adjusted under 35 U.S.C. 154(b) by 0 days.

(21) Appl. No.: 16/330,761

(22) PCT Filed: Dec. 13, 2016

(86) PCT No.: PCT/CN2016/109664
§ 371 (c)(1),
(2) Date: Mar. 5, 2019

(87) PCT Pub. No.: WO2018/049739
PCT Pub. Date: Mar. 22, 2018

(65) Prior Publication Data
US 2019/0228498 A1 Jul. 25, 2019

(30) Foreign Application Priority Data
Sep. 13, 2016 (CN) .......................... 201610822118.1

(51) Int. Cl.
*G06T 1/60* (2006.01)
*G06T 11/00* (2006.01)
(Continued)

(52) U.S. Cl.
CPC .............. *G06T 1/60* (2013.01); *G06F 16/583* (2019.01); *G06T 9/00* (2013.01); *G06T 11/00* (2013.01); *G06T 2210/32* (2013.01)

(58) Field of Classification Search
CPC ... G06T 1/60; G06T 11/00; G06T 9/00; G06T 2210/32; G06F 16/583
(Continued)

(56) References Cited

U.S. PATENT DOCUMENTS 4,811,411 A * 3/1989 Hashihara ................. G06T 1/60
382/284
2012/0050574 A1* 3/2012 Choi ................... G11B 27/3027
348/231.99
(Continued)

FOREIGN PATENT DOCUMENTS

CN 101059949 A 10/2007
CN 101644764 A 2/2010
(Continued)

OTHER PUBLICATIONS

CN International Search Report in application No. PCT/CN2016/109664 dated Jun. 13, 2017.
(Continued)

*Primary Examiner* — Lin Ye
*Assistant Examiner* — Chan T Nguyen
(74) *Attorney, Agent, or Firm* — W&K IP (57) ABSTRACT

The present invention discloses a method and device for storing image data, the method includes: receiving image data to-be-stored; extracting basic information of the image data and generating a header file; partitioning the image data by a preset block size according to the basic information of the image data, and generating a data file; and storing the header file and the data file and generating a storage file. In the present invention, image data are stored as double files, so as to add basic information of an image into the image, and in storing a massive-data image, the image is partitioned by a preset size prior to sequential storage, so that when the image is displayed, only one or several sub-blocks of the image are extracted and displayed, allowing quick display of the image with massive data, improving the efficiency of image display.

8 Claims, 4 Drawing Sheets

(51) Int. Cl.
    *G06T 9/00*     (2006.01)
    *G06F 16/583*     (2019.01)

(58) Field of Classification Search
    USPC ...................................................... 348/231.3
    See application file for complete search history.

(56) References Cited

U.S. PATENT DOCUMENTS

2012/0300976 A1    11/2012    Tanaka et al.
2017/0344845 A1*  11/2017    Kaneko ................ G06K 9/0063

FOREIGN PATENT DOCUMENTS

| CN | 105786942 | | 7/2015 | |
|---|---|---|---|---|
| CN | 105786942 | * | 7/2016 | ............. G06F 17/30 |
| CN | 105786942 A | | 7/2016 | |
| WO | 2006/134509 A2 | | 6/2006 | |
| WO | 2006134509 A2 | | 12/2006 | |

OTHER PUBLICATIONS

CN Written Opinion in application No. PCT/CN2016/109664 dated Jun. 13, 2017.
CN Office Action in application No. 201610822118.1 dated Jul. 30, 2018.
CN Office Action in application No. 201610822118.1 dated Feb. 26, 2019.
Tian-chun et al., "File Segmentation of GPR Data", Geophysical & Geochemical Exploration, vol. 29., No. 1, Feb. 2005.

\* cited by examiner

METHOD AND DEVICE FOR STORING IMAGE DATA

TECHNICAL FIELD

The present invention relates to the technical filed of image processing, in particular to a method and device for storing image data.

BACKGROUND

Detection of a moving target is an important cutting-edge technology in remote sensing and image processing. With the development of satellite remote sensing technology, long strides have been taken in exploring and detecting objects moving at high speed by use of satellite remote sensing technology, which is playing an increasingly important role in various sectors of national economic construction.

In emergency response, such as disaster reduction and disaster relief, the detection technology of a moving target is also given a full play. The moving object detection, for instance, can quickly find humans moving among ruins, wining precious prime-time for disaster rescue and relief. The technology is able to judge movement and distribution of group targets, shedding light on the movement of the affected people instantly when the road is impassable. With the technology, it is possible to monitor vehicles on the road and calculate the speed thereof, thereby effectively judging congestion on the road in storm or blizzard disasters. Moreover, the detection can realize quick detection of a ship target in the vast sea, providing vital support for maritime search and rescue, besides which the technology can also determine and issue an alarm against any moves of pirates, providing information guarantee for overseas convoys.

At present, a dynamic remote sensing image taken by satellite remote sensing technology is a multi-band image, different from a traditional one in that it increases the band for storing movement information of the target. The traditional remote sensing image format is suitable for static remote sensing images, whereas providing no support for dynamic remote sensing ones. In the case a common GIF format is used to store the dynamic remote sensing images, slow display or crash-down of a display tends to happen during image display because of enormous data volume of the dynamic remote sensing images, significantly affecting the display efficiency of images.

SUMMARY

The technical problem to be solved by the present invention is to provide a block type image data storage method and device that allows a stored image to be displayed in blocks during display, so as to quickly display images with massive data.

To solve the above technical problem, the present invention adopts the following technical solutions:

In an aspect of the present invention, a method for storing image data is provided, including:
  receiving image data to-be-stored;
  extracting basic information of the image data and generating a header file;
  partitioning the image data by a preset block size according to the basic information of the image data, and generating a data file; and
  storing the header file and the data file and generating a storage file.

wherein, the basic information includes a storage type of pixels of the image data, the length and width of the image, the height and width of each sub-block stored in blocks, an image pantograph ratio of the image data, the maximum and minimum of each band of the image data, as well as the wavelength of each band.

Wherein, the partitioning the image data by a preset block size according to the basic information of the image data, and generating a data file further includes:
  determining whether the image data are a thumbnail image according to the image pantograph ratio of the image data;
  if not, partitioning the image data by the preset block size and generating a data file;
  wherein, when the image of the image data is determined to be a thumbnail image, defining the image data as a data file.

Wherein, the partitioning the image data by a preset block size is further performed by:
  transversely partitioning the image of the image data according to the height of the each sub-block stored in blocks; and
  longitudinally partitioning the image of the image data according to the width of the each sub-block stored in blocks.

Wherein, the storing the data file is further carried out by:
  sequentially storing each row of the sub-blocks with each sub-block as a unit.

wherein, the storage type of pixels is any one of an unsigned char type, an int16 type, an int32 type, a float type and a double type.

Another aspect of the present invention provides an image data generation device, including:
  a receiving unit, for receiving to-be-stored image data;
  a header file generation unit, for extracting basic information of the image data and generate the header file;
  a data file generation unit, for partitioning the image data by a preset block size according to the basic information of the image data, and generating a data file; and
  a storage file generation unit, for storing the header file and the data file and generate a storage file.

Wherein, the header file generation unit further includes:
  an information extraction unit, for extracting the basic information of the image data, the basic information includes: a storage type of pixels, the length and width of the image, the height and width of each sub-block stored in blocks, an image pantograph ratio of the image data, the maximum and minimum of each band of the image data, as well as the wavelength of each band; and
  a header file generation subunit, for generating the header file according to the basic information.

Wherein, the data file generation unit further includes:
  a determination unit, for determining whether the image data are a thumbnail image according to the image pantograph ratio of the image data;
  a partitioning unit, for partitioning the image data by the preset block size when the determination unit determines the image data not to be a thumbnail image;
  a data file generation subunit, for partitioning the image data according to the partitioning unit and generating the data file.

Wherein, the data file generation unit also includes:
  a second data file generation subunit, for defining the image data as the data file when the image of the image data is determined to be a thumbnail image.

Wherein, the blocking unit further includes:

a transverse blocking subunit, for transversely partitioning the image of the image data according to the height of the each sub-block stored in blocks; and a longitudinal blocking subunit, for longitudinally partitioning the image of the image data according to the width of the each sub-block stored in blocks.

Wherein, the storage file generation unit further includes a data file storage unit for sequentially storing each row of the sub-blocks with each sub-block as a unit.

Wherein, the storage type of pixels is any one of an unsigned char type, an int16 type, an int32 type, a float type and a double type.

Compared with the prior art, the technical solutions of the present invention have the following advantages:

In the present invention, image data are stored as double files, so that basic information of an image can be added to the image, and when a massive-data image is stored, the image is partitioned by a preset size prior to sequential storage, so that when the image is displayed, only one or several sub-blocks of the image are extracted and displayed, allowing quick display of the image with massive data, improving the efficiency of image display, while facilitating display of target movement information in the image.

Other features and advantages of the present invention will be described in the following description, and partly become clear from the description, or get understood by implementation of the present invention. The purpose and other advantages of the present invention can be realized and obtained from the description, the claims, and structures specified in the accompanying drawings.

The technical solutions of the present invention will be further described by the drawings and embodiments below.

BRIEF DESCRIPTION OF THE DRAWINGS

Various other advantages and benefits will become clear to one with ordinary skill in the art by reading the following detailed description of the preferred implementations. The drawings are merely intended to illustrate the purpose of the preferred implementations, and not to be deemed as limits imposed on the present invention. Throughout the drawings, the same referential numeral designations represent like elements. In the drawings.

DETAILED DESCRIPTION

Exemplary embodiments of the present disclosure will be described in more detail in reference with the drawings below. Although the exemplary embodiments of the present disclosure are shown in the drawings, it should be understood that, the present disclosure may be implemented in various ways rather than being limited by the embodiment stated herein. In contrast, these embodiments are provided for a thorough understanding of the present disclosure, and to convey the scope of the present disclosure to those skilled in the art integrally.

Figure 1:
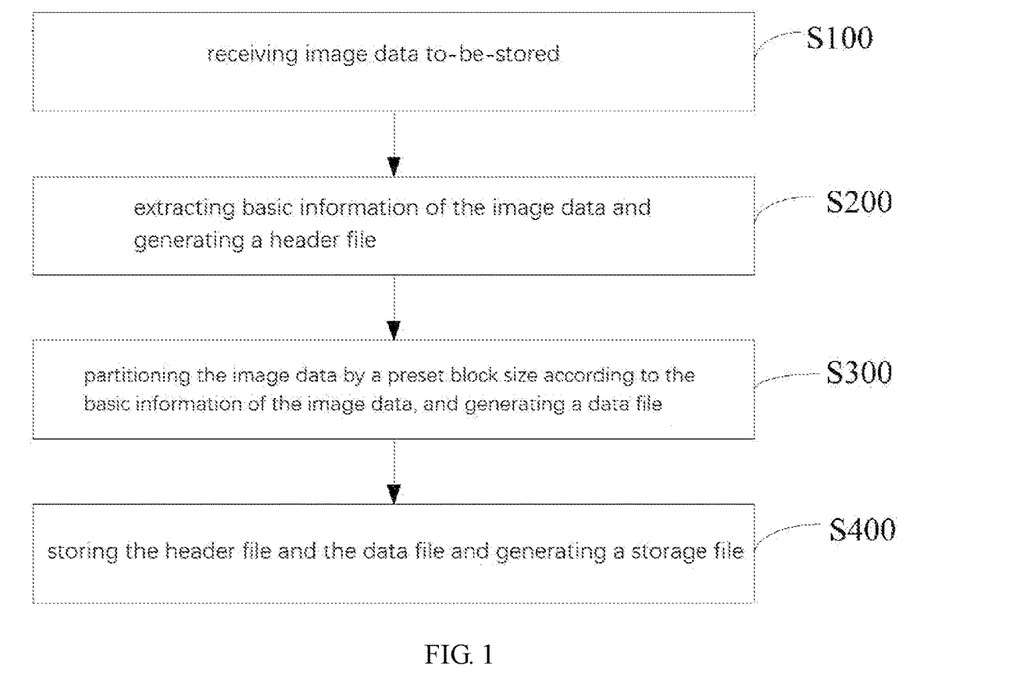
FIG. 1 is a flowchart for an image data storage method of an embodiment of the present invention.

FIG. 1 is a flowchart for an image data storage method of an embodiment of the present invention;

As shown in FIG. 1, the image data storage method of the present invention further includes the following steps:

S100, receiving image data to-be-stored.

In this embodiment, the image data to-be-stored refer to a massive-data image, such as a remote sensing dynamic image shot by the technology of satellite remote sensing, but the image data of this embodiment are not confined to a remote sensing dynamic image, other images with massive data are also applicable in this embodiment.

S200, extracting basic information of the image data and generating a header file.

In this embodiment, the image data are stored in double files, i.e., stored in a header file portion mixed with a data file portion, the header file portion is mainly used for describing the basic information of an image, and in this embodiment, the basic information of the image is stored in the form of text files.

In an embodiment, if the image data are a dynamic remote sensing image, then the basic information may include information such as: storage type of pixels of image data, length and width of the image, height and width of each sub-block stored in blocks, image pantograph ratio of the image data, maximum value and minimum value of each band of the image data, as well as wavelength of each band.

Further, the storage type of pixels is any one of an unsigned char type, an int16 type, an int32 type, a float type and a double type.

In the above basic information, the image pantograph ratio of the image data is introduced for enabling a quick glance at panorama of the image when a remote sensing image is opened. If the size of the remote sensing image is smaller than the display screen of a user, then the pantograph ratio is −1, or a value indicating the factor by which the length and width should be zoomed down, when the whole remote sensing image is to be displayed on one display screen.

For example, in an embodiment, the header file of a dynamic remote sensing image may include the following contents:

image type: classified
number of rows: 570
number of columns: 348
type of pixels: char
number of bands: 1
width of each sub-block: 64
height of each sub-block: 64
preview zoom factor: 0.000000
maximum and minimum gray value:
target motion information:
0
986895 . . . .

The header file of the basic information may be a text file, for example, a text file with H as a suffix of the file, the format of the header file, however, is specifically not restricted herein, other formats of texts are also applicable to the present invention.

S300, partitioning the image data by a preset block size according to the basic information of the image data, and generating a data file.

Figure 2:
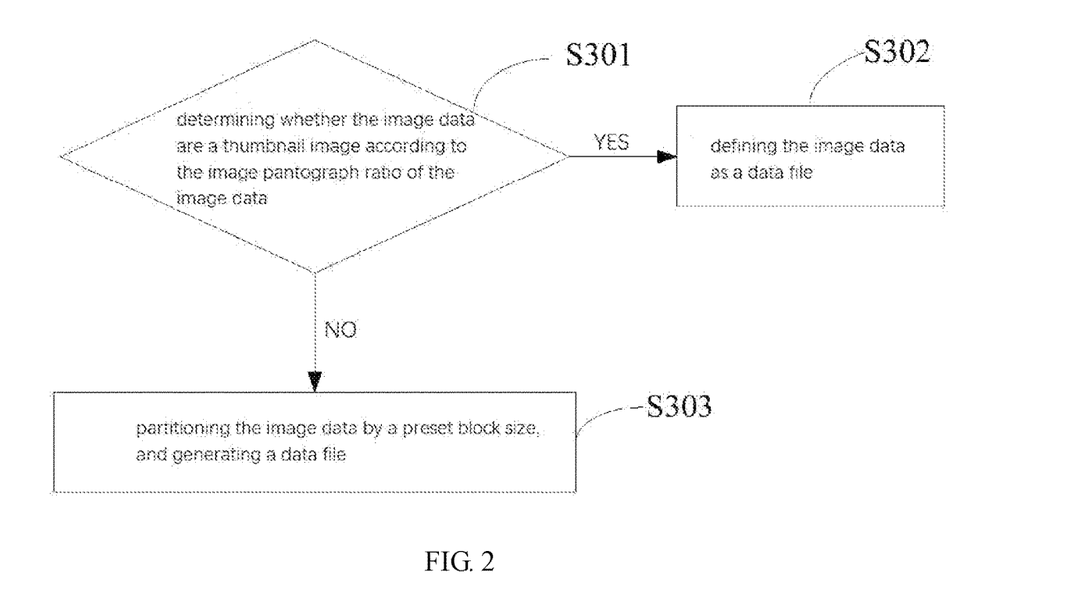
FIG. 2 is a flowchart for Step S300 for an image data storage method of the present invention.

In this embodiment, as shown in FIG. 2, Step S300 is specifically performed by:

S301, determining whether the image data are a thumbnail image according to the image pantograph ratio of the image data;

S302, if yes, defining the image data as a data file.

S303, if not, partitioning the image data by the preset block size and generating a data file, the data file in this embodiment may use DAT as a suffix of the file.

In this embodiment, in storing the data portion of an image, a pantograph ratio of 0.0 suggests this portion is made up of original data, otherwise the data portion includes a thumbnail image. Thus in generating a data file, determining whether the image data are a thumbnail image, if they are, using the existing image storage technology directly for storage, namely, directly defining the image data as data file for storage.

If the image data are an original image, the image is partitioned before storage, due to low efficiency in display of a massive-data image, such that in displaying the original image, it only needs to read blocks of essential display part into memory instead of reading in the whole image, efficiently improving the display performance.

In this embodiment, partitioning the image data by the preset block size is specifically performed by:

transversely partitioning the image of the image data according to the height of the each sub-block stored in blocks; and longitudinally partitioning the image of the image data according to the width of the each sub-block stored in blocks.

Namely, in partitioning the image data, partitioning the image in transverse blocks with the height of each sub-block as the block height, thereby partitioning the image into multiple rows; partitioning the image in longitudinal blocks with the width of each sub-block as the block width, thereby partitioning the image into multiple columns.

After transverse partitioning and longitudinal partitioning, the image is partitioned into multiple sub-blocks.

In an embodiment, when the length and/or width of an image is not integral times of the partitioning length and/or width during transverse partitioning and longitudinal partitioning of the image, then if the size of the last block during transverse partitioning and the last block during longitudinal partitioning is smaller than the height and/or width of the sub-block, the last block is defined as an edge block, and stored along with the sub-blocks as the data file.

S400, storing the header file and the data file and generating a storage file.

In this embodiment, when the data file is stored, each sub-block is regarded as a unit, and each row of the sub-blocks is sequentially stored.

Figure 3:
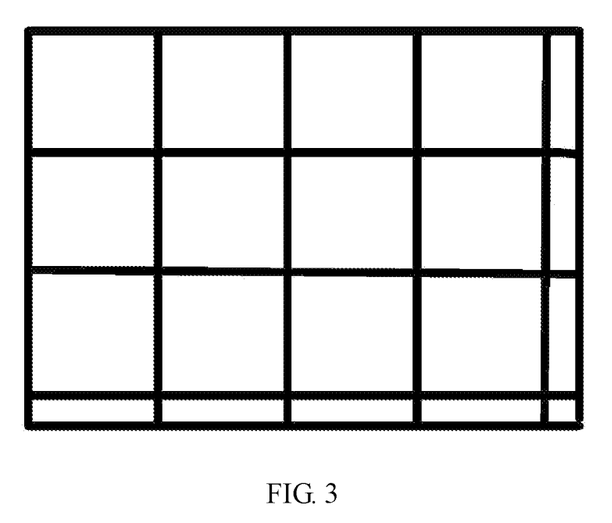
FIG. 3 is a diagram showing image partitioning of an embodiment of the present invention.

In an embodiment, as shown in FIG. 3, an image with a length of 272 and a width of 208 is stored. During partitioning, the size of each sub-block is set to be 64*64, after transverse partitioning and longitudinal partitioning of the image, there are 4 regions in the transverse direction and 5 regions in the longitudinal direction. From the first great row to the third great row, the first 4 sub-blocks in each great row are 64*64, and the last one is an edge block, which are stored by 16 transversely (the remainder from division of 272 by 64) and 64 longitudinally. In the last great row, for the first four edge blocks, each edge block is stored by 64 transversely, and 16 longitudinally (the remainder from division of 208 by 64), and the last edge block is stored by 16 both transversely and longitudinally.

After the partitioning, a data file partitioned into different blocks is formed, and stored. In storage, the first block of the first great row is firstly stored, then the second block thereof, until the first great row is completely stored, then the second great row is stored in the same sequence, until the data in the band are all stored. The data in each band are stored in the same way.

In the image data storage method of the present invention, the image data are stored as double files, so that basic information of an image can be added to the image, and when a massive-data image isx stored, the image is partitioned by a preset size prior to sequential storage, so that when the image is displayed, only one or several sub-blocks of the image are extracted and displayed, allowing quick display of the image with massive data, improving the efficiency of image display, while facilitating display of target movement information in the image.

Figure 4:
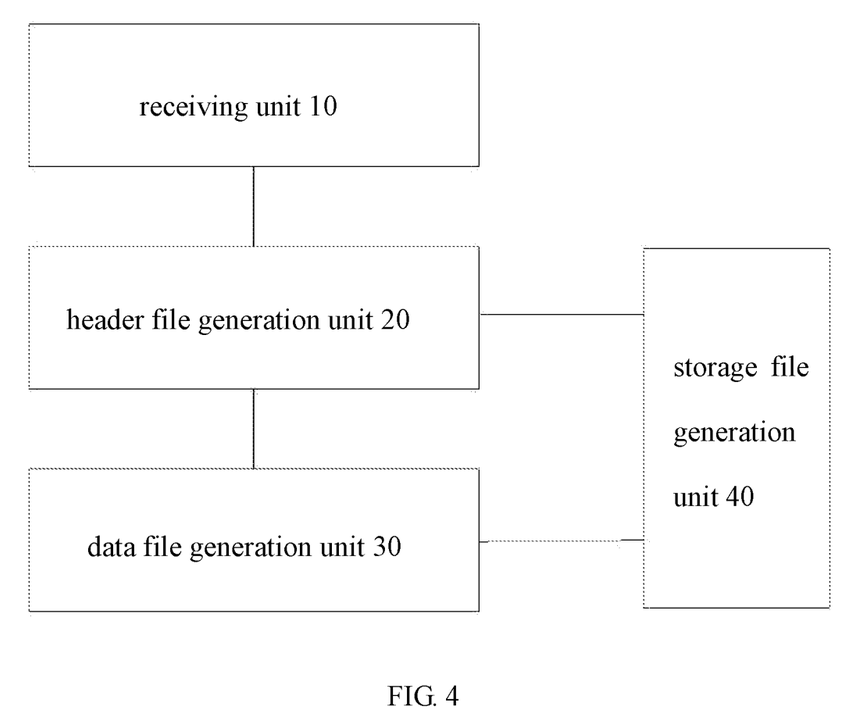
FIG. 4 is a structural diagram for an image data generation device of the present invention.

Corresponding to the method for storing image data provided by the above embodiment, embodiments of the present invention also provide an image data generation device, as shown in FIG. 4, the image data generation device further includes:

a receiving unit 10, for receiving to-be-stored image data;

an header file generation unit 20, for extracting basic information of the image data and generating a header file;

a data file generation unit 30, for partitioning the image data by a preset block size according to the basic information of the image data, and generating a data file; and a storage file generation unit 40, for storing the header file and the data file and generating a storage file.

The device in this embodiment can be used for implementing the technical solution in the method embodiment shown in FIG. 1, following a similar principle and delivering similar effect, which will not be repeated herein.

Figure 5:
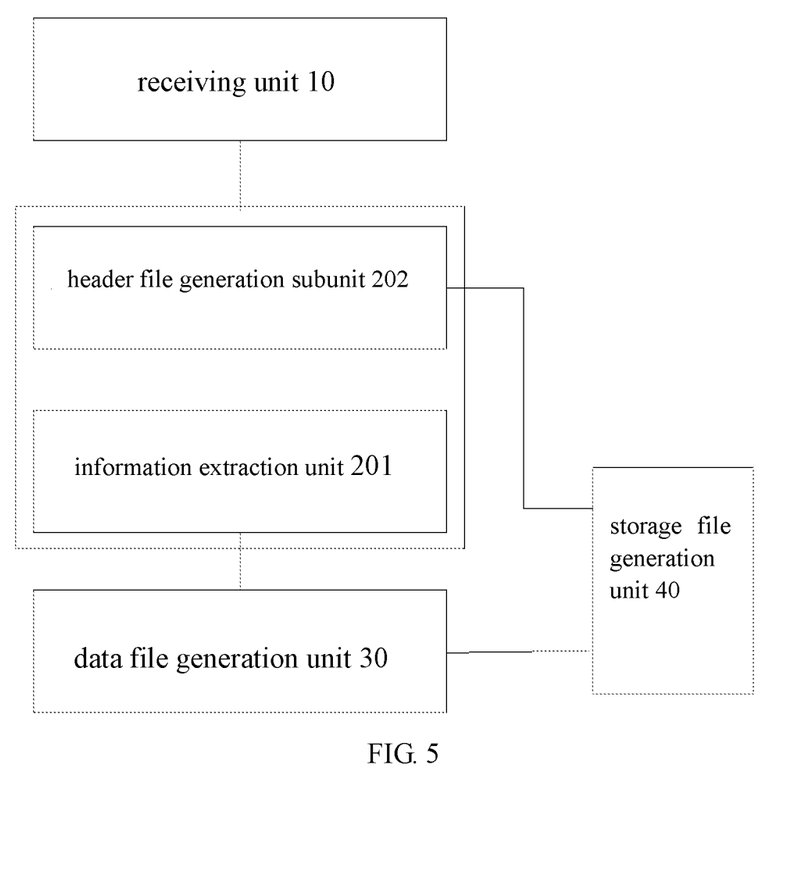
FIG. 5 is a structural diagram for an embodiment of an image data generation device of the present invention.

In an embodiment, as shown in FIG. 5, the header file generation unit 20 further includes:

an information extraction unit 201, for extracting basic information of the image data, the basic information including information such as: a storage type of pixels, the length and width of the image, the height and width of each sub-block stored in blocks, an image pantograph ratio of the image data, the maximum and minimum of each band of the image data, as well as the wavelength of each band; and a header file generation subunit 202, for generating the header file according to the basic information.

Further, the storage type of pixels is any one of a unsigned char type, an int16 type, an int32 type, a float type and a double type.

Figure 6:
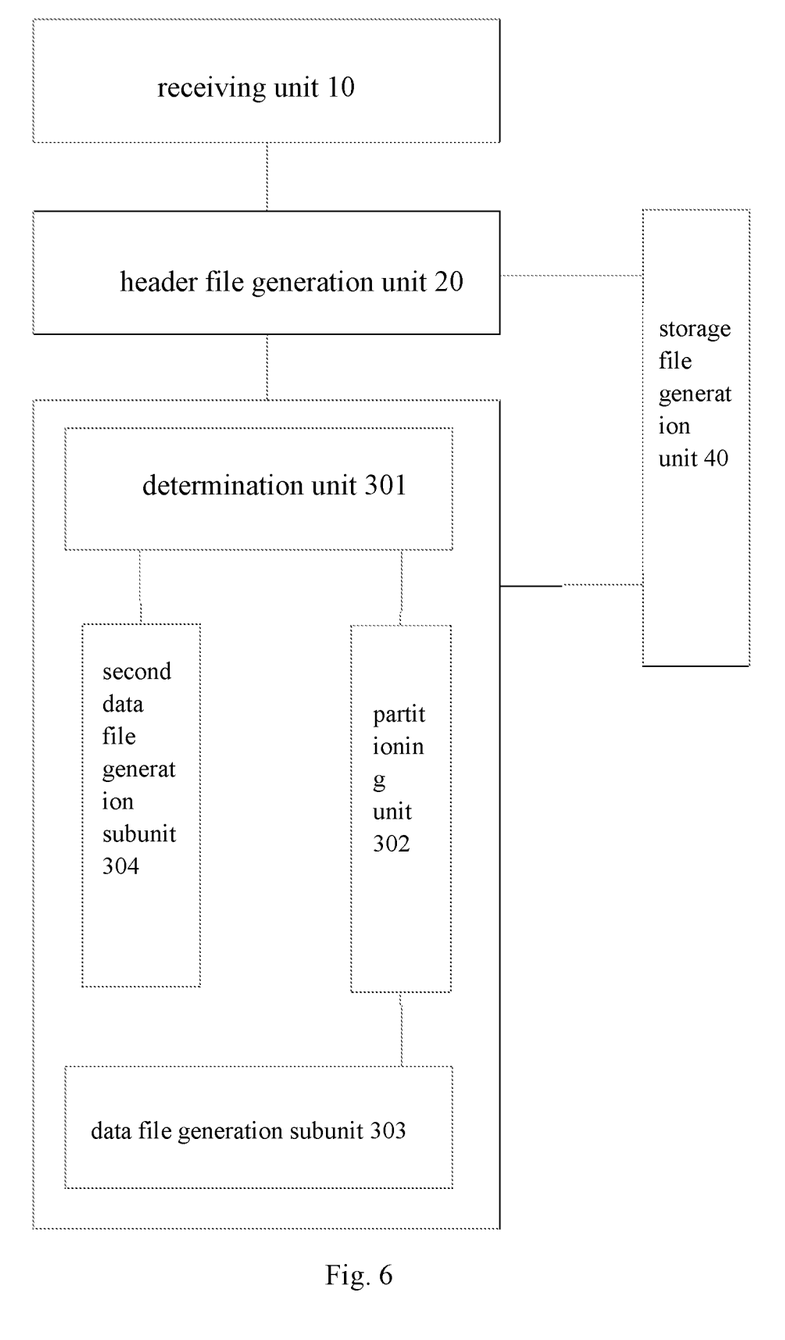
FIG. 6 is a structural diagram for another embodiment of an image data generation device of the present invention.

Moreover, in an embodiment, as shown in FIG. 6, the data file generation unit 30 further includes:

a determination unit 301, for determining whether the image data are a thumbnail image according to the image pantograph ratio of the image data;

a partitioning unit 302, for partitioning the image data by the preset block size when the determination unit determines the image data not to be a thumbnail image;

a data file generation subunit 303, for partitioning the image data according to the partitioning unit and generating the data file; and a second data file generation subunit 304, for defining the image data as the data file when the image of the image data is determined to be a thumbnail image.

Further, the partitioning unit 302 further includes:

a transverse partitioning subunit 3021, for transversely partitioning the image of the image data according to the height of the each sub-block stored in blocks; and a longitudinal partitioning subunit 3022, for longitudinally partitioning the image of the image data according to the width of the each sub-block stored in blocks.

In another embodiment, the storage file generation unit 40 further includes: a data file storage unit, for sequentially storing each row of the sub-blocks with each sub-block as a unit.

Compared with the prior art, the technical solutions of the present invention are mainly advantaged in that:

In the present invention, image data are stored as double files by the image data generation device, so that basic information of an image can be added to the image, and when a massive-data image is stored, the image is partitioned by a preset size prior to sequential storage, so that when the image is displayed, only one or several sub-blocks of the image are extracted and displayed, allowing quick display of the image with massive data, improving the efficiency of image display.

Those skilled in the art should understand that, the embodiments of the present invention can be offered as a method, system, or computer program product. Therefore, the present invention can be in the form of all-hardware embodiments, all-software embodiments, or embodiments combining software and hardware aspects. And the present invention may take the form of a computer program product implemented on one or more computer-available storage media (including but not limited to magnetic disk memory and optical memory, etc.).

The present invention is described with reference to flowcharts or block diagrams for the method, device (system), and computer program products according to the embodiments of the present invention. It should be understood that each process and/or block in the flowcharts or block diagrams, as well as the combination of processes and/or blocks therein are implemented by computer program instructions. These computer program instructions can be provided to a general purpose computer, a dedicated computer, an embedded processor or a processor of other programmable data processing devices to produce a machine, allowing instructions executed by a computer or a processor of another programmable data processing device to generate a device for realizing functions specified in a process or plural processes in a flowchart and/or a block or plural blocks in a block diagram.

These computer program instructions can also be stored in computer readable memory that can boot the computer or other programmable data processing devices to work in a specific way, allowing instructions stored in the computer readable memory to generate manufactures including the instructed device. The instructed device realizes functions specified in a process or plural processes in a flowchart and/or a block or plural blocks in a block diagram.

These computer program instructions can also be loaded on a computer or other programmable data processing device so that a series of operational steps are performed on the computer or other programmable device to produce procedures implemented by the computer. In such a way, instructions executed on the computer or other programmable device provide steps for realizing functions specified in a process or plural processes in a flowchart and/or a block or plural blocks in a block diagram.

Apparently, various modifications and variations can be made to the present invention by those skilled in the art without departing from the spirit and scope of the present invention. In doing this, should the modifications and variations to the present invention fall into the scope of the present invention claim and equivalent technology thereof, the same modifications and variations are also intended to be included in the present invention.

The invention claimed is:

1. A method for storing image data, characterized in comprising:
   receiving image data to-be-stored;
   extracting basic information of the image data and generating a header file;
   partitioning the image data by a preset block size according to the basic information of the image data, and generating a data file; and
   storing the header file and the data file and generating a storage file;
   the partitioning the image data by a preset block size according to the basic information of the image data, and generating a data file further comprises:
   determining whether the image data are a thumbnail image according to the image pantograph ratio of the image data;
   when the image of the image data is determined to be a thumbnail image, defining the image data as a data file;
   if not, partitioning the image data by the preset block size and generating a data file.

2. The method for storing image data in accordance with claim 1, characterized in that, the basic information comprises a storage type of pixels of the image data, the length and width of the image, the height and width of each sub-block stored in blocks, an image pantograph ratio of the image data, the maximum and minimum of each band of the image data, as well as the wavelength of each band.

3. The method for storing image data in accordance with claim 2, characterized in that, the partitioning the image data by a preset block size is further performed by:
   transversely partitioning the image of the image data according to the height of the each sub-block stored in blocks; and
   longitudinally partitioning the image of the image data according to the width of the each sub-block stored in blocks.

4. The method for storing image data in accordance with claim 3, characterized in that, the storing the data file is further carried out by:
   sequentially storing each row of the sub-blocks with each sub-block as a unit.

5. An image data generation device, characterized in comprising:
   a receiving unit, for receiving to-be-stored image data;
   a header file generation unit, for extracting basic information of the image data and generate the header file;
   a data file generation unit, for partitioning the image data by a preset block size according to the basic information of the image data, and generating a data file; and
   a storage file generation unit, for storing the header file and the data file and generate a storage file;
   the data file generation unit further comprises:
   a determination unit, for determining whether the image data are a thumbnail image according to the image pantograph ratio of the image data;
   a blocking unit, for partitioning the image data by the preset block size when the determination unit determines the image data not to be a thumbnail image;
   a data file generation subunit, for partitioning the image data according to the partitioning unit and generating the data file; and
   a second data file generation subunit, for defining the image data as the data file when the image of the image data is determined to be a thumbnail image.

6. The image data generation device in accordance with claim 5, characterized in that, the header file generation unit further comprises:
- an information extraction unit, for extracting the basic information of the image data, the basic information comprises: a storage type of pixels, the length and width of the image, the height and width of each sub-block stored in blocks, an image pantograph ratio of the image data, the maximum and minimum of each band of the image data, as well as the wavelength of each band; and
- a header file generation subunit, for generating the header file according to the basic information.

7. The image data generation device in accordance with claim 6, characterized in that, the partitioning unit further comprises:
- a transverse blocking subunit, for transversely partitioning the image of the image data according to the height of the each sub-block stored in blocks; and
- a longitudinal blocking subunit, for longitudinally partitioning the image of the image data according to the width of the each sub-block stored in blocks.

8. The image data generation device in accordance with claim 7, characterized in that, the storage file generation unit further comprises a data file storage unit for sequentially storing each row of the sub-blocks with each sub-block as a unit.

* * * * *